(12) United States Patent
Chen et al.

(10) Patent No.: US 7,983,732 B2
(45) Date of Patent: Jul. 19, 2011

(54) METHOD, SYSTEM, AND COMPUTER SOFTWARE PRODUCT FOR AUTOMATED IDENTIFICATION OF TEMPORAL PATTERNS WITH HIGH INITIAL ENHANCEMENT IN DYNAMIC MAGNETIC RESONANCE BREAST IMAGING

(75) Inventors: Weijie Chen, Chicago, IL (US); Maryellen L Giger, Elmhurst, IL (US); Gillian Newstead, Chicago, IL (US)

(73) Assignee: The University of Chicago, Chicago, IL (US)

( * ) Notice: Subject to any disclaimer, the term of this patent is extended or adjusted under 35 U.S.C. 154(b) by 1668 days.

(21) Appl. No.: 11/056,366

(22) Filed: Feb. 14, 2005

(65) Prior Publication Data

US 2006/0018548 A1    Jan. 26, 2006

Related U.S. Application Data

(60) Provisional application No. 60/544,239, filed on Feb. 13, 2004.

(51) Int. Cl.
*A61B 5/00* (2006.01)
(52) U.S. Cl. .......................................... 600/407; 382/128
(58) Field of Classification Search .................. 600/420, 600/407; 382/128
See application file for complete search history.

(56) References Cited

OTHER PUBLICATIONS

Kuhl et al., "Dynamic Breast MR imaging: Are signal intensity time course data useful for differential diagnosis of enhancing lesion?", Radiology, vol. 211, pp. 101-110, 1999.*
Ahmed et al., "A modified fuzzy c-means algorithm for bias field estimation and segmentation of MRI data", IEEE Trans. Med. Imag., vol. 21, pp. 193-1999, 2002.*

* cited by examiner

*Primary Examiner* — Brian Casler
*Assistant Examiner* — Jonathan G Cwern
(74) *Attorney, Agent, or Firm* — Oblon, Spivak, McClelland, Maier & Neustadt, L.L.P.

(57) ABSTRACT

A method, system, and computer software product for analyzing medical images, including obtaining image data representative of a plurality of medical images of the abnormality, each medical image corresponding to an image of the abnormality acquired at a different time relative to a time of administration of a contrast medium, each medical image including a predetermined number of voxels; partitioning each medical image into at least two groups based on the obtained image data, wherein each group corresponds to a subset of the predetermined number of voxels, and each group is associated with a temporal image pattern in the plurality of medical images; selecting, from among the temporal patterns, an enhancement temporal pattern as representative of the abnormality; and determining, based on the selected temporal pattern, a medical state of the abnormality.

17 Claims, 11 Drawing Sheets

FIG. 1A
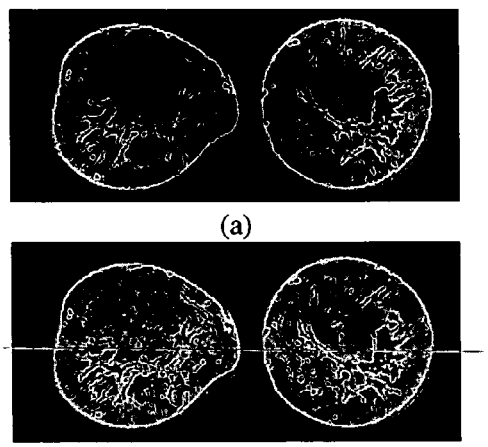
(a)
FIG. 1B
FIG. 1C
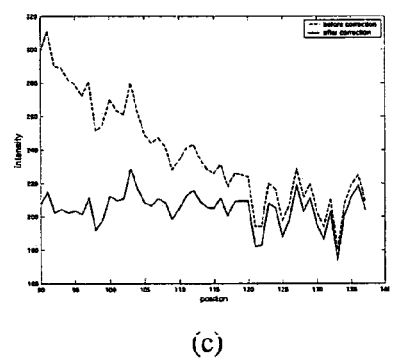
(c)

FIG. 6A
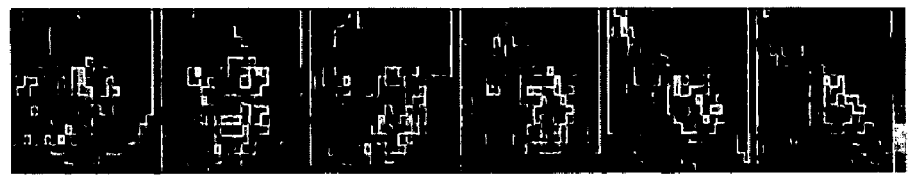
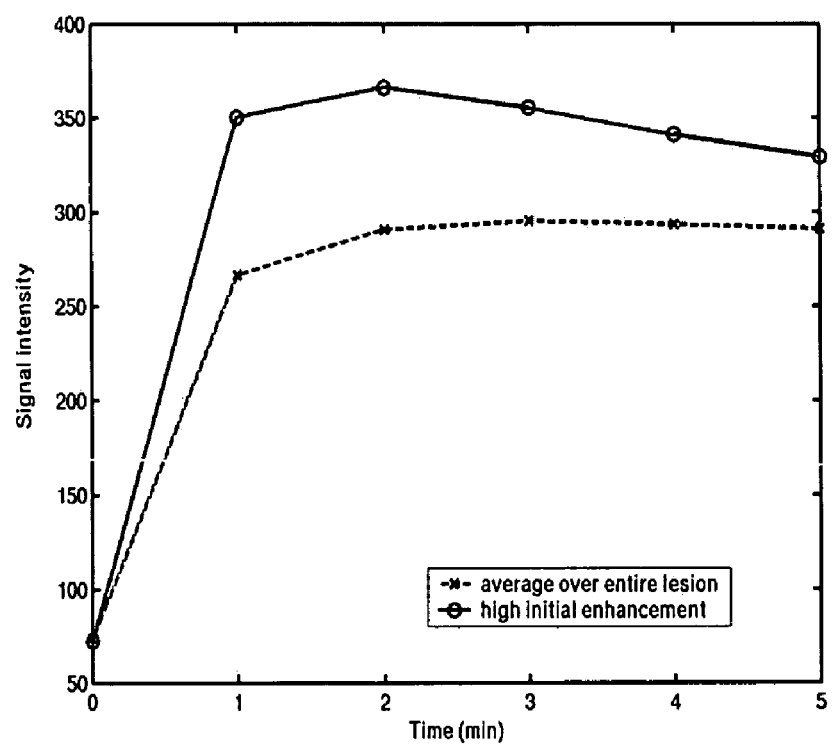
FIG. 6B

000# METHOD, SYSTEM, AND COMPUTER SOFTWARE PRODUCT FOR AUTOMATED IDENTIFICATION OF TEMPORAL PATTERNS WITH HIGH INITIAL ENHANCEMENT IN DYNAMIC MAGNETIC RESONANCE BREAST IMAGING

CROSS-REFERENCE TO RELATED APPLICATIONS

This application claims the benefit under 35 U.S.C. §119 of the filing date of Provisional Application No. 60/544,239, filed Feb. 13, 2004, the contents of which are incorporated herein by reference.

BACKGROUND OF THE INVENTION

Field of the Invention

The present invention relates to automated methods for identifying regions with high initial enhancement within an anatomical lesion to aid in assessing the lesion for diagnostic, risk, and prognostic value.

The present invention relates to automated methods for identifying regions automated analysis of digital images, for example, as disclosed in one or more of U.S. Pat. Nos. 4,839,807; 4,841,555; 4,851,984; 4,875,165; 4,918,534; 5,072,384; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,141,437; 6,185,320; 6,205,348; 6,240,201; 6,282,305; 6,282,307; 6,317,617 as well as U.S. patent application Ser. Nos. 08/173,935; 08/398,307 (PCT Publication WO 96/27846); 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 09/990,377; 10/360,814; and 60/331,995; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes the use of various technologies referenced and described in the documents identified in the following LIST OF REFERENCES, which are cited throughout the specification by the corresponding reference number in brackets:

LIST OF REFERENCES

[1] J. A. Murray, A. Ghaforr, E. Ward, and M. J. Thurn, "Cancer statistics, 2003," *Cancer J. Clin.*, vol. 53, pp. 5-266, 2003.

[2] I. W. G. on Breast MRI, "Technical report of the international working group on breast MRI," *J Magn. Reson. Imaging*, vol. 10, pp. 980-1, 1999.

[3] M. D. Schnall, "Breast MR imaging," *Radiol. Clin. N. Am.*, vol. 41, pp. 43-50, 2003.

[4] S. H. Heywang, D. Hahn, H. Schmidt, I. Krischke, W. Eiermann, R. Bassermann, and J. Lissner, "MR imaging of the breast using gadolinium-DTPA," *J. Comput. Assist. Tomagr.*, vol. 10, pp. 199-204, 1986.

[5] S. H. Heywang, A. Wolf, E. Pruss, T. Hilbertz, W. Eiermann, and W. Permanetter, "MR imaging of the breast with gd-DTPA: use and limitations," *Radiology*, vol. 171, pp. 95-103, 1989.

[6] W. A. Kaiser and E. Zeitler, "MR imaging of the breast: fast imaging sequence with and without gd-DTPA," *Radiology*, vol. 170, pp. 681-686, 1989.

[7] C. K. Kuhl and H. H. Schild, "Dynamic image interpretation of MRI of the breast," *J Magn. Reson. Imaging*, vol. 12, pp. 965-974, 2000.

[8] T. H. Helbich, "Contrast-enhanced magnetic resonance imaging of the breast," *Eur. J of Radiology*, vol. 34, pp. 208-219, 2000.

[9] E. A. Morris, "Breast cancer imaging with MRI," *Radiol. Clin. N. Am.*, vol. 40, pp. 443-466, 2002.

[10] M. V. Knopp, E. Weiss, H. P. Sinn, J. Mattern, H. Junkermann, J. Radeleff, A. Magener, G. Brix, S. Delorme, I. Zuna, and G. van Kaick, "Pathophysiologic basis of contrast enhancement in breast tumors," *J. Magn. Reson. Imaging*, vol. 10, pp. 260-266, 1999.

[11] C. Boetes, J. Barentsz, R. D. Mus, R. F. van der Sluis, L. J. van Erning, J. H. Hendriks, R. Holland, and S. H. Ruys, "MR characterization of suspicious breast lesions with a gadolinium-enhanced turboFLASH subtraction technique," *Radiology*, vol. 193, pp. 777-781, 1994.

[12] R. Gilles, J. M. Guinebretiere, O. Lucidarme, P. Cluzel, G. Janaud, J. F. Finet, A. Tardivon, J. Masselot, and D. Vanel, "Nonpalpable breast tumors: diagnosis with contrast-enhanced subtraction dynamic mr imaging," *Radiology*, vol. 191, pp. 625-631, 1994.

[13] P. C. Stomper, S. Herman, D. L. Klippenstein, J. S. Winston, S. B. Edge, M. A. Arredondo, R. V. Mazurchuk, and L. Blumenson, "Suspect breast lesions: findings at dynamic gadolinium-enhanced MR imaging correlated with mammographic and pathologic features," *Radiology*, vol. 197, pp. 387-395, 1995.

[14] C. K. Kuhl, P. Mielcareck, S. Klaschik, C. Leutner, E. Wardelmann, J. Gieseke, and H. H. Schild, "Dynamic breast mr imaging: Are signal intensity time course data useful for differential diagnosis of enhancing lesion?," *Radiology*, vol. 211, pp. 101-110, 1999.

[15] S. G. Orel, M. D. Schnall, V. A. LiVolsi, and R. H. Troupin, "Suspicious breast leison: MR imaging with radiologic-pathologic correlation," *Radiology*, vol. 190, pp. 485-493, 1994.

[16] L. W. Nunes, M. D. Schnall, S. G. Orel, M. G. Hochman, C. P. Langlotz, and C. A. Reynolds, "Breast MR imaging: Interpretation model," *Radiology*, vol. 202, pp. 833-841, 1997.

[17] L. W. Nunes, M. D. Schnall, and S. G. Orel, "Update of breast MR imaging architectural interpretation model," *Radiology*, vol. 219, pp. 484-494, 2001.

[18] K. G. A. Gilhuijs, M. L. Giger, and U. Bick, "Computerized analysis of breast lesions in three dimensions using dynamic magnetic-resonance imaging," *Med. Phys.*, vol. 25, pp. 1647-1654, 1998.

[19] P. Gibbs and L. W. Turnbull, "Textural analysis of contrast-enhanced MR images of the breast," *Magn. Reson. Med.*, vol. 50, pp. 92-98, 2003.

[20] K. Kinkel and N. M. Hylton, "Challenges to interpretation of breast MRI," *J. Magn. Reson. Imaging*, vol. 13, pp. 821-829, 2001.

[21] D. M. Ikeda, N. M. Hylton, K. Kinkel, M. G. Hochman, C. K. Kuhl, W. A. Kaiser, J. C. Weinreb, S. F. Smazal, H. Degani, P. Viehweg, J. Barclay, and M. D. Schnall, "Development, standardization, and testing of a lexicon for reporting contrast-enhanced breast magnetic resonance imaging studies."

[22] M. D. Schnall and D. M. Ikeda, "Lesion diagnosis working group on breast M R," *J. Magn. Reson. Imaging*, vol. 10, pp. 982-990, 1999.

[23] M. L. Giger, Z. Huo, M. A. Kupinski, and C. J. Vyborny, "Computer-aided diagnosis in mammography," in *Handbook of Medical Imaging, Volume 2. Medical Imaging Processing and Analysis* (M. Sonka and M. J. Fitzpatrick, eds.), pp. 915-1004, SPIE, 2000.

[24] J. Bezdek, *Pattern Recognition with Fuzzy Objective Function Algorithm*, New York: Plenum Press, 1981.

[25] J. Bezdek and S. K. Pal, *Fuzzy Models for Pattern Recognition*, Piscataway, N.J.: IEEE Press, 1992.

[26] J. C. Bezdek, L. 0. Hall, and L. P. Clarke, "Review of MR image segmentation techniques using pattern recognition," *Med. Phys.*, vol. 20, pp. 1033-1048, 1993.

[27] D. L. Pham and J. L. Prince, "Adaptive fuzzy segmentation of magnetic resonance images," *IEEE Trans. Med. Imag*, vol. 18, pp. 737-752, 1999.

[28] M. N. Ahmed, S. M. Yamany, N. Mohamed, A. A. Farag, and T. Moriarty, "A modified fuzzy c-means algorithm for bias field estimation and segmentation of MRI data," *IEEE Trans. Med. Imag.*, vol. 21, pp. 193-199, 2002.

[29] R. B. R, C. Windischberger, and E. Moser, "Quantification in functional magnetic resonance imaging: Fuzzy clustering vs. correlation analysis," *Magn. Reson. Imaging*, vol. 16, pp. 115-125, 1998.

[30] H. S. -Z. Hesamoddin Jahanian, Gholam-Ali Hossein-Zadeh, and B. A. Ardekani, "Controlling the false positive rate in fuzzy clustering using randomization: application to fMRI activation detection," *Magn. Reson. Imaging*, vol. 22, pp. 631-638, 2004.

[31] W. M. Wells, W. E. L. Grimson, R. Kikinis, and F. A. Jolesz, "Adaptive segmentation of MRI data," *IEEE Trans. Med. Imag*, vol. 15, no. 4, pp. 429-442, 1996.

[32] R. M. Haralick and L. G. Shapiro, Computer and Robot Vision, vol. 1., Boston, Mass., USA: Addison-Wesley, 1992.

[33] P. Soille, *Morphological Image Analysis: Principles and Applications*, Telos: Springer-Verlag, 1999.

[34] K. G. A. Gihuijs, M. L. Giger, and U. Bick, "A method for computerized assessment of tumor extent in contrast-enhanced MR images of the breast," in *Computer-Aided Diagnosis in Medical Imaging* (K. Doi, H. MacMahon, M. L. Giger, and K. R. Hoffmann, eds.), pp. 305-310, Amsterdam: Elsevier, 1999.

[35] R. *A. Johnson and D. W. Wichern, Applied Multivariate Statistical Analysis*, Englewood Cliffs, N.J.: Prentice-Hall, 3rd ed., 1992.

[36] C. E. Metz, "Some practical issues of experimental design and data analysis in radiological ROC studies," *Invest. Radiol.*, vol. 24, pp. 234-245, 1989.

[37] C. E. Metz, B. A. Herman, and C. A. Roe, "Statistical comparison of two ROC-curve estimates obtained from partially-paired datasets," *Medical Decision Making*, vol. 18, pp. 110-121, 1998.

The entire contents of each reference listed in the LIST OF REFERENCES are incorporated herein by reference.

Discussion of the Background

Breast cancer is the most common malignancy in women and the major cause of death among women in most western countries. The American Cancer Society expects an estimated 266,000 new breast cancer cases and 39,800 deaths associated with breast cancer in 2003 in the United States [1]. Since there is currently no cure or way to prevent breast cancer, early detection by breast imaging plays a major role in reducing mortality.

X-ray mammography is the primary imaging modality in diagnostic and screening practice and has achieved significant success, though there are considerable limitations. For instance, about 15%-20% of cancers are missed by mammography. Moreover, 75% of lesions detected by conventional mammography are actually benign and result in many unnecessary medical procedures including biopsies [2]. In addition, diagnosis based on mammography is problematic for women with radio-dense breast tissue.

Consequently, extensive efforts in the past 15 years were directed to the use of magnetic resonance imaging (MRI) and sonography as complementary imaging modalities to improve breast imaging interpretation [3].

Contrast-enhanced MR Imaging of the Breast

In dynamic contrast-enhanced (DCE) magnetic resonance imaging (MRI) of the breast, signal-intensity time curves have proven useful in differentiating between benign and malignant lesions. Due to uptake heterogeneity in a breast lesion, however, the signal-intensity time curve over a specific region in the lesion, rather than the entire lesion, is expected to perform better. Algorithms with which to reveal different temporal patterns in breast lesions presented on MRI need to be developed.

In DCE-MRI, each voxel is represented by a vector of signals over time points. Fuzzy c-means (FCM) can partition the voxels in the 3-D lesion into a number of groups by minimizing a fuzzy generalization of a squared cost function. The algorithm finds fuzzy cluster centers (i.e., temporal patterns) and assigns membership values to each voxel. The temporal pattern with maximum initial enhancement can then be selected as a representative curve of the lesion with the thresholded membership map being the identified area of fast enhancement.

Improvements and modifications to this method are needed for use in many aspects of breast imaging, including the characterization and diagnosis of lesions, the detection of underlying ductal carcinoma in situ (DCIS), the assessment of breast cancer risk, the segmentation of lesion vs. non-lesion, the segmentation of dense vs. fatty regions in the breast, the assessment of tumor extent for surgery and radiation planning, and the determination of an intensity inhomogeneity correction and segmentation of MR images.

Breast MRI has emerged as a promising modality for the detection and diagnosis of breast cancer since the introduction of gadolinium-diethylenetriamine penta-acetic acid (Gd-DTPA) as a contrast agent [4-6]. Historically, researchers started doing breast MRI at two ends of the spectrum of imaging techniques: one used high temporal resolution techniques attempting to distinguish benign and malignant lesions by enhancement characteristics (the "dynamic school") while another used high spatial resolution techniques attempting to distinguish benign and malignant lesions by characteristic morphologic features (the "static school") [7]. This disparity is mainly due to technical limitations at different institutions at the time the research was being conducted. Today, it is possible to integrate both techniques owing to technical progress. Yet there is still no standardized and generally accepted protocols for breast MR imaging. However, there is considerable agreement among radiologists about a suitable MR imaging technique [3,7-9]. First, dedicated double surface coils are generally considered indispensable and high magnetic field and strong gradients should be used for improved contrast enhancement. T1-weighted three-dimensional gradient echo pulse sequences are used for dynamic breast MR imaging for 6-10 minutes following bolus injection of Gd-DTPA. Typically, one precontrast and a series of postcontrast images including both breasts at a temporal resolution of 60~90 seconds are acquired. The dose of the contrast agent is generally between 0.1 and 0.2 mmol/kg body weight. The spatial resolution is around 1 mm in all planes and the slice thickness is approximately 2 mm with no gap.

The mechanism of action of gadolinium is to change the T1 relaxation time of the water within the breast tissue [3]. Typical breast tissue and breast lesions have T1 values varying from 700 milliseconds to 1000 milliseconds (at 1.5 T); these T1 values will decrease to approximately 200 milliseconds (at 1.5 T) when gadolinium is injected. Shortening the T1 value leads to an increase of signal intensity in T1-weighted images. The increased signal intensity is a complex function of the concentration of gadolinium delivered to the tissue, the inherent T1 value of the tissue, and the pulse sequence being used.

Whereas the diagnostic benefits of gadolinium are firmly established in breast MR imaging, the pathophysiologic basis of the observed enhancement and its histopathologic correlations have not been fully elucidated [7,10]. The differentiation between benign and malignant breast lesions with CEMRI is based on the assumption that breast tumors differ in their microvascular density (MVD) and vessel permeability, two surrogates of angiogenesis. It is well known that malignant lesions release angiogenic factors (e.g., vascular endothelial growth factor (VEGF)) that induce sprouting and growth of pre-existing capillaries and induce the formation of new vessels.

Histologic studies have revealed that these newly induced capillaries exhibit a pathologic vessel architecture with leaky enhothelial linings. An increased MVD leads to focally increased inflow of contrast media and an increased vessel permeability leads to an accelerated extravasation of contrast media at the site of the tumor. However, increased MVD and/or capillary permeability is by no means specific for malignant tissues; in fact, many benign lesions exhibit a significant hypervascularity.

The differential diagnostic power of evaluating contrast enhancement is surprisingly better than one might expect given the overlap in the MVD between malignant and benign lesions. This phenomenon may be explained [7] by the fact that it is not the mere MVD, but rather the vessel architecture, permeability, and tissue relaxation times that determines contrast enhancement, and, thus, differential diagnosis in dynamic breast MRI. [These pathophysiologic facts and clinical observations may be regarded as the basis of the idea of combining multiple categories of image features in the proposed computerized interpretation scheme.

Interpretation of Breast MRI

The major task in interpreting breast MR images is to determine the likelihood of malignancy for any suspicious enhancement in the images using certain criteria. A large variety of diagnostic criteria have been investigated in clinical studies [5,6,11-14]. Table 1, wherein m stands for malignant and b stands for benign, lists some of the enhancement kinetics criteria summarized in a review by Kuhl and Schild [7]. In a study on enhancement kinetics [14], signal intensity time curves of the lesions were categorized into one of the three types: type I, corresponding to a steady enhancement, type II, a plateau curve after Gd administration, or type III, a washout time course. The distributions of curve types for 101 malignant lesions (m) and 165 benign lesions (b) was: malignant (type I 8.9%, type II 33.6%, type III 57.4%); benign (type I 83.0%, type II11.5%, type III 5.5%). The distributions are significantly different and lead to an overall diagnostic accuracy of 86% (sensitivity 91%, specificity 83%). The results are encouraging; however, there is a considerable overlap in enhancement patterns between malignant and benign lesions.

Alternatively, morphologic criteria have been investigated [15] and a structured approach to the use of architectural features in breast MRI has been described [16,17]. These studies have shown that smooth or lobulated borders have a high negative predictive value for carcinoma (95% and 90%, respectively). Spiculated and irregular margins have high positive predictive value (91% and 81%, respectively). In addition, rim enhancement and internal septation are strong indicators of malignancy. Computerized classification of breast lesions in CE-MRI using morphologic features has also been reported [18] with similar findings, and it was also shown that an analysis based on 3-D lesions could yield a better diagnostic accuracy than one based on a 2-D slice. In a recent study[19], texture features have proven useful in distinguishing malignant and benign lesions.

Overall, the interpretation criteria for evaluating MR studies vary greatly in the literature of breast MRI; each criterion works on the specific patient population with specific imaging protocol. However, the reproducibility, effectiveness, and relative significance of these criteria are far from being well evaluated. Image interpretation remains a very challenging problem and the lack of interpretation guidelines [7,20,21] is still one of the major obstacles preventing the introduction of MRI into routine clinical breast imaging. Very few attempts have been made to standardize the interpretation of breast MR images. Among the few efforts in this regard is the work of the International Working Group on Breast MRI, which has developed and validated a detailed lexicon for breast MRI interpretation [22]. The paramount consensus reached among radiologists regarding the interpretation of breast MRI in recent years is that both enhancement kinetics and morphologic features in CE-MRI are important and should somehow be combined in the task of distinguishing between malignant and benign breast lesions [3,9,21].

TABLE I

| Author | Criteria | Patients | Sensitivity | Specificity |
|---|---|---|---|---|
| Heywang[5], 1989 | Enhancement magnitude | 71m + 73b | 100% | 27% |
| Stomper[13], 1995 | Enhancement rate | 25m + 26b | 92% | 61% |
| Gilles[12], 1994 | Onset of enhancement | 64m + 79b | 95% | 53% |
| Boetes[11], 1994 | Onset and location of enhancement | 65m + 22b | 95% | 86% |
| Kuhl[14], 1999 | Type of enhancement curve | 101m + 164b | 91% | 83% |

Computer-aided diagnosis (CAD) in other areas, such as mammography [23], lung CT, CT colonography, have been extensively investigated and been proven useful in aiding the radiologists for detection and diagnosis of various of cancers. CAD research on breast MRI, however, is urgently needed with the increasing applications of dynamic MRI in clinical breast imaging practice.

Computer analysis may play a more significant role in breast MRI interpretation than it does in other conventional modalities because the amount of data is huge in breast MRI;

in addition, the data are four-dimensional (4-D) and thus information extraction by human eyes may become more complicated than in 2-D and 3-D data. There is therefore a need for new useful diagnostic techniques that are unavailable in the current clinical practice to help radiologists better interpret breast MR images and improve the effectiveness, efficiency, and accuracy of breast cancer diagnosis.

Bias field correction is a pre-processing step for computerized analyses of MR images corrupted with intensity inhomogeneity artifacts. There is a need for a novel algorithm that is efficient enough to be used in a clinical environment and overcomes the limitations of current bias field correction algorithms. In addition, an algorithm that simultaneously estimates the bias field and segments the images is desirable since it could then be used in other applications. For example, such an algorithm could be used to assess the percentage of dense tissue in the breast volume, which is an indicator of breast cancer risk. More generally, such an algorithm could also be used in bias field correction and segmentation of MR images acquired with surface coils.

Accurate quantification of the shape and extent of breast tumors plays a vital role in nearly all applications of breast MR imaging. Specifically, tumor segmentation is a key component in computerized assessment of likelihood of malignancy, as characteristic features are computed based on the segmented lesions and it is expected that contrast-enhancement measures will be more stable and meaningful when applied to accurately segmented lesions. There is therefore a need for automatic tumor delineation, which is also of clinical value, for example, in surgical planning or follow-up during neoadjuvant chemotherapy. The manual outlining of the tumor on a 4D MRI dataset is quite time-intensive and impractical since it may take 20-30 minutes of the radiologist's time. Automatic delineation of the tumor or the remains of a tumor after radiation or surgery would also be useful in follow-up.

A large variety of diagnostic criteria are currently being investigated and significant variations in diagnostic accuracy exist. The variation of the results may be due to two reasons from the interpretation aspect; one is the inter-observer variation from different subjective judgments, and the other is that the current interpretation schemes might not be sufficiently robust. The significance of the proposed methods for automatic feature extraction is twofold: investigation and evaluation of lesion characteristics will expedite the standardization of interpretation guidelines; computerized feature combination and classification will provide quantitative indices of malignancy automatically and consistently, with the potential to help reduce intra- and inter-observer variations.

An algorithm finding fuzzy cluster centers (i.e., temporal patterns) and assigning membership values to each voxel is also needed. Such an algorithm, identifying highly enhancing regions potentially indicating signs of underlying DCIS disease or earlier signs of breast cancer would be of great clinical relevance.

SUMMARY OF THE INVENTION

According to an aspect of the present invention, there is provided a method, system, and medium for analyzing medical images, A computer-implemented method for analyzing medical images, comprising: obtaining dynamic image data representative of dynamic medical images of an abnormality; determining, based on the dynamic image data, temporal patterns for the abnormality, each temporal pattern corresponding to a subset of voxels of the abnormality; identifying, based on the determined temporal patterns, a high initial enhancement temporal pattern as representative of the abnormality; and inferring, based on the identified temporal pattern, a medical state of the abnormality.

Accordingly, an object of the present invention is to provide a method and system employing either computer analysis or an intelligent workstation for computer-assisted interpretation of breast MRI images.

Another object of the present invention is to provide a method for characterizing an image in terms of temporal patterns of a particular type of enhancement.

Another object of the present invention is to provide a method for segmenting an image in terms of temporal patterns of a particular type of enhancement for distinguishing between, e.g., fat and dense regions, or lesion and non-lesion regions.

Another object of the present invention is to provide a method for characterizing the image in terms of temporal patterns of a particular type of enhancement and subsequently into different disease states, e.g., malignant and benign categories.

Another object of the present invention is to provide a method for characterizing the bias field in the MRI image.

Another object of the present invention is to provide a method for characterizing an MRI image for use in assessing risk of breast cancer.

Another object of the present invention is to provide a method for characterizing an MRI image for use in detecting early signs of breast cancer, e.g., via DCIS.

Another object of the present invention is to provide an automated method and a system implementing this method for determining and/or employing/incorporating computerized analysis for computer-assisted interpretation of MRI breast image.

These and other objects are achieved according to embodiments of the present invention by providing a new automated method and system employing an intelligent computer system/workstation for computer-assisted interpretation of breast MRI medical images.

According to an aspect of the present invention there is provided a method, system, and computer program product for determining a medical state of an abnormality, comprising: (1) obtaining image data representative of a plurality of medical images of the abnormality, each medical image corresponding to an image of the abnormality acquired at a different time relative to a time of administration of a contrast medium, each medical image including a predetermined number of voxels; (2) partitioning each medical image into at least two groups based on the obtained image data, wherein each group corresponds to a subset of the predetermined number of voxels, and each group is associated with a temporal image pattern in the plurality of medical images; (3) selecting, from among the temporal patterns, an enhancement temporal pattern as representative of the abnormality; and (4) determining, based on the selected temporal pattern, a medical state of the abnormality.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A-1C illustrate a sample breast MRI including original and corrected images along with intensity profiles of a fat area before and after bias correction;

FIGS. 6A and 6B illustrate a malignant case with a 3-D lesion displayed across 6 slices;

DETAILED DESCRIPTION OF THE PREFERRED EMBODIMENTS

Figure 2:
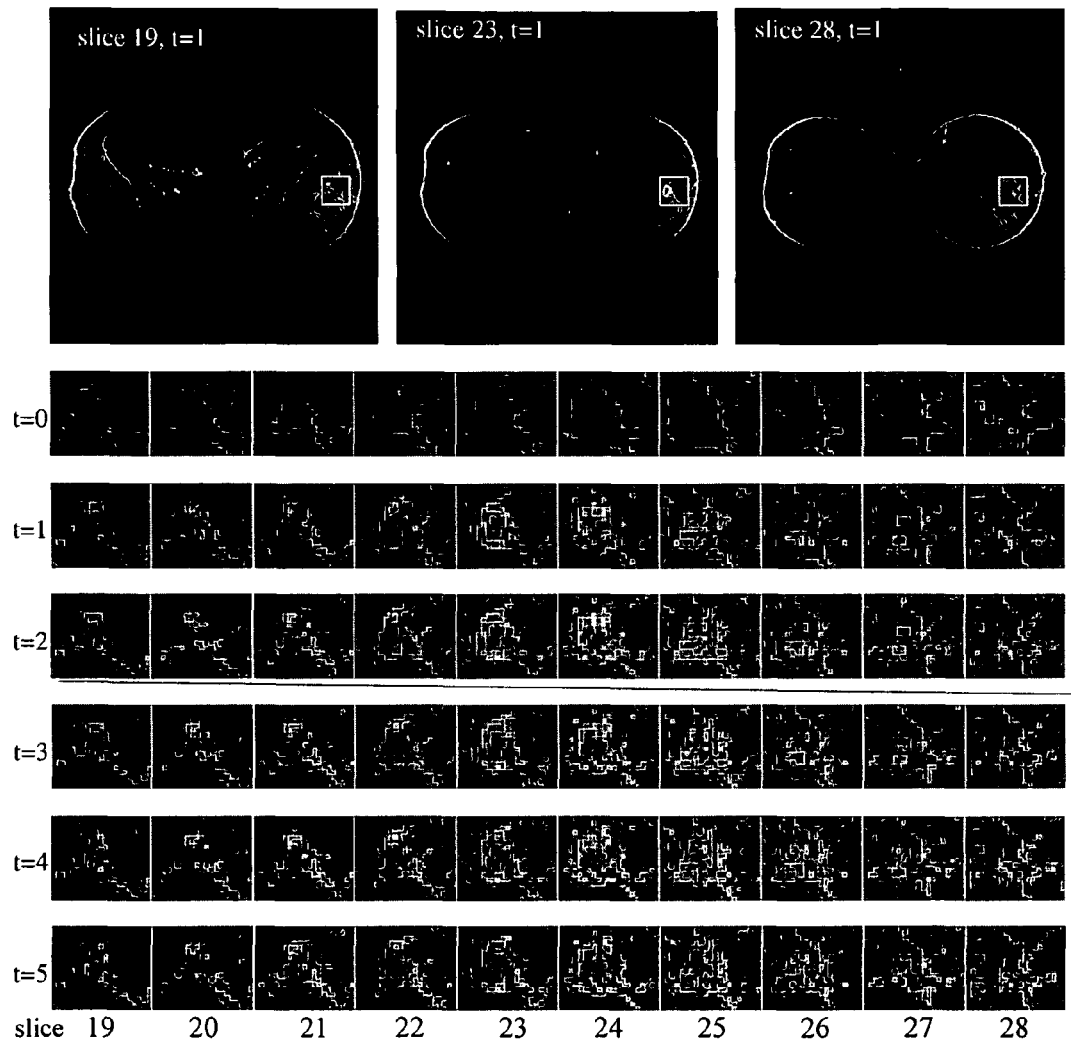
FIG. 2 illustrates a 4-D region of interest (ROI) including three slices at a fixed time and time-series of multiple slices.

Embodiments of the present invention describe methods and systems for use in many aspects of breast imaging including the characterization and diagnosis of lesions, the detection of underlying breast disease, the assessment of risk of breast cancer, the segmentation of lesion vs. non-lesion, the segmentation of dense vs. fatty regions in the breast, the assessment of tumor extent for surgery and radiation planning, and the determination of a intensity inhomogeneity correction and segmentation of MR images.

Upon viewing an unknown medical case, a computer outputs an analysis expressed either in terms of characteristics of the breast, the background, the density, the potential of underlying breast disease, the characteristics of the lesion, the lesion extent, and/or the probability of malignancy.

Database

Consider a first database of 121 cases including 77 malignant and 44 benign masses, as revealed by biopsy. Images in this database were obtained using a T1-weighted 3D spoiled gradient echo sequence (TR=8.1 ms, TE=4 ms, flip angle=30°). Fat suppression was not employed. The patients were scanned in prone position using a standard double breast coil on a 1.5 T whole-body MRI system (Siemens Vision, Siemens, Erlangen, Germany). After the acquisition of the precontrast series, Gd-DTPA contrast agent was delivered intravenously by power injection with a dose of 0.2 mmol/kg and a flow rate of 2 ml/s. Injection of contrast was followed by a saline flush of 20 ml with the same flow rate. Five postcontrast series were then taken with a time interval of 60 s. Each series contained 64 coronal slices with a matrix of 128×256 pixels and an in-plane resolution of 1.25×1.25 mm². Slice thickness ranged from 2 to 3 mm depending on breast size. The image database had been retrospectively collected under an IRB-approved protocol.

Fuzzy C-means (FCM) Clustering Algorithm

FCM is an unsupervised learning technique from the pattern recognition field [24,25]. The goal of FCM is to find the (fuzzy) partition of a dataset X comprising N data points $(X=\{(x_i, i=1,2,\ldots N | x_i \in \mathcal{R}^p\})$ into c classes (a.k.a. "clusters" or "groups"). The data point $x_i$ is a p-dimensional feature vector. The (unknown) class prototypes are represented by a c by p matrix V, the $k^{th}$ row of which is a p-dimensional vector and represents the prototype of the k class. The partition is represented by a c by N partition matrix U. The element of matrix U, $u_{ki}$, represents the membership of the $i^{th}$ data point in the $k^{th}$ class. Note that in a crisp partition of the data points, the membership value is binary, i.e., a data point is assigned a value of 1 if it belongs to the $k^{th}$ class and 0 otherwise. With a fuzzy partition, however, the membership value (say, uki) continuously ranges from 0 to 1 and characterizes the degree of similarity between the $i^{th}$ data point and the $k^{th}$ class prototype.

The matrix U is found by minimizing the generalized least squares within group square error (WGSE) functional $J_m$:

$$J_m = \sum_{k=1}^{c} \sum_{i=1}^{N} u_{ki}^b \|x_i - v_k\|^2 \quad (1)$$

subject to the following constraints:

$$\sum_{k=1}^{c} u_{ki} = 1, \forall i; 0 \leq u_{ki} \leq 1, \forall k, i; \sum_{i=1}^{N} u_{ki} > 0, \forall k \quad (2)$$

where $b \in [1, \infty)$ is a weighting exponent on each fuzzy membership, and $\|.\|$ denotes the Euclidean distance. The necessary conditions for the WGSE functional to be minimized under the constraints in (2) can be derived by Lagrange multipliers:

$$u_{ki} = \frac{1}{\sum_{l=1}^{c} \left(\frac{\|x_i - v_k\|}{\|x_i - v_l\|}\right)^{\frac{2}{b-1}}}, k = 1, 2, \ldots, c; i = 1, 2, \ldots, N \quad (3)$$

$$v_k = \frac{\sum_{i=1}^{N} u_{ki} x_i}{\sum_{i=1}^{N} u_{ki}^b}, k = 1, 2, \ldots, c \quad (4)$$

In the implementation, the matrix V is randomly initialized, then U and V are obtained through an iterative process using Eq. (3) and Eq. (4). The following describes how to use FCM and its variants in MR image segmentation [26-28] and analysis of functional MRI of the human brain [29,30] for the analysis of CE-MRI of the breast. Here the parameter b will be set as b=2, although other values are possible.

Automatic Bias Field Correction

The observed MRI signal intensity is modeled as the "true" signal intensity multiplied by a spatially-varying factor called the gain field. Specifically, $$Y_i = X_i G_i \forall i \in \{1, 2, \ldots, N\} \quad (5)$$

where $Y_i$, $X_i$, and $G_i$ are the observed intensity, true intensity, and gain field at the ith voxel, respectively. N is the total number of voxels in the MR image. The artifact can be modeled as an additive bias field by applying a logarithmic transformation to both sides of equation (5) [31]:

$$y_i = x_i + \beta_i \forall i \in \{1, 2, \ldots, N\} \quad (6)$$

where $y_i$, $x_i$ are the observed and true log-transformed intensities at the ith voxel, respectively, and $\beta_i$ is the bias field at the ith voxel. By incorporating the bias field model into the fuzzy c-mean framework, one can iteratively estimate both the true intensity and the bias field from the observed intensity.

To incorporate the bias field into the FCM framework, substitute (6) into (1). Fuzzy segmentation with the presence of bias field then becomes the constrained optimization problem:

$$\arg\min_{U,V,B} J_m(U, V, B; Y) = \sum_{k=1}^{c}\sum_{i=1}^{N} u_{ki}^b \|y_i - \beta_i - v_k\|^2 \quad (7)$$

subject to $$\sum_{k=1}^{c} u_{ki} = 1, \forall i; 0 \le u_{ki} \le 1, \forall k, i; \sum_{i=1}^{N} u_{ki} > 0, \forall k \quad (8)$$

where $Y=\{y_i\}_{i=1}^{N}$ is the observed image and $B=\{\beta_i\}_{i=1}^{N}$ is the bias field image. To solve (7), one takes the first derivatives of $J_m$ with respect to $u_{ki}$, $v_k$, and $\beta_i$ and sets them equal to zero thereby obtaining three necessary conditions for $J_m$ to be at a minimum:

$$u_{ki}^* = \frac{1}{\sum_{l=1}^{c}\left(\frac{\|y_i - \beta_i - v_k\|}{\|y_i - \beta_i - v_l\|}\right)^2} \quad (9)$$

$$v_k^* = \frac{\sum_{i=1}^{N} u_{ki}(y_i - \beta_i)}{\sum_{i=1}^{N} u_{ki}^2} \quad (10)$$

$$\beta_i^* = y_i - \frac{\sum_{k=1}^{c} u_{ki}^2 v_k}{\sum_{k=1}^{c} u_{ki}^2} \quad (11)$$

The objective function $J_m$ in Eq. (7) can be minimized by performing Picard iteration through the above three necessary conditions. However, B obtained from (11) is a "residual" image, but is not necessarily the bias field image. A residual image could always be found that would set $J_m$ to zero. Pham and Prince's AFCM algorithm [27] proposed to solve this problem by introducing regularization terms into the objective function that ensure that the resulting bias field image is smooth. However, the regularization terms make the estimation of the bias field a computationally intensive process.

Instead, consider estimating the bias field by filtering the residual image B obtained from (11) with an iterative low-pass spatial filter. This filtering strategy is based on the fact that the bias field is of low spatial frequency and the assumption that other components in the residual image are of higher frequency.

An algorithm according to an embodiment of the present invention addresses these issues and can be described by the following steps:

1. Initialize class centroid values $\{v_k\}_{k=1}^{c}$ and initialize $\{\beta_i\}_{i=1}^{N}$ with zeros.
2. Update the partition matrix U using Eq. (9).
3. Update the class centroids V using Eq. (10).
4. Estimate the residual image using Eq. (11).
5. Filter the residual image using an iterative low-pass filter.
6. Go to Step 2 unless the following termination criterion is satisfied:

$$\|v_{new} - v_{old}\| < \epsilon \quad (12)$$

FIGS. 1A-1C illustrate a sample breast MRI. FIGS. 1A and 1B represent the original and bias corrected images, respectively. An area consisting mainly of fat tissue, indicated by the line in FIG. 1A, was selected. FIG. 1C shows plots of the intensity profile for both the original and the bias corrected images. From the intensity profile of the original image, one can see that the intensity inhomogeneity in the clinical database can be as large as 40%.

From the corrected intensity profile, one can see that the algorithm has successfully removed the bias field. For a typical breast MR image in the database, the algorithm converged within 1-2 seconds on a PC with a 1.2 GHz AMD Athlon processor when using the parameters c=2 and $\epsilon$=0.001.

Automatic Tumor Segmentation—Lesion Extent

According to an embodiment of the invention, a method for lesion segmentation in CE-MRI consists of six consecutive steps: (1) selecting a region of interest (ROI) using a human operator, (2) enhancing a lesion within the selected ROI, (3) applying FCM to the enhanced ROI, (4) binarizing the lesion membership map, (5) labelling connected components and selecting an object, and (6) filling any hole on the selected object. Note that operator interaction is only required at the initial stage to indicate the lesion location.

The volume data in each time-series consists of multiple slices. In the first stage, a box-shaped ROI containing the 3-D lesion is formed from three inputs of a human operator: (1) the first slice in which lesion appears, (2) the last slice in which the lesion appears, and (3) a rectangle bounding the lesion in some representative middle slice. The rectangle defines the largest extent within each slice; the first slice and the last slice define the cross-slice extent of the lesion. The interaction could be quickly done with a mouse on a computer's graphical-user-interface (GUI) that displays multiple slices simultaneously.

FIG. 2 illustrates at the top the first slice, the last slice, and a typical central slice containing the lesion with a rectangle defining the planar extent of the lesion. The rectangle drawn by the human operator is then duplicated on each slice at the same planar location from the first slice to the last slice. The three slices shown are from the first postcontrast series (t=1). FIG. 2 further illustrates in the bottom the 4-D ROI, with each row representing a time series and each column representing a slice.

FIGS. 3A-3D illustrates enhanced postcontrast ROI series. In the second step, the postcontrast ROI series are enhanced by dividing the intensity value at each voxel by the intensity value at the corresponding precontrast voxel. Given the number N of voxels in the ROI, then $x_i(t)$ (i=1, 2, ..., N, t=1, 2, ..., 5) is the normalized intensity value at voxel i of the $t^{th}$ postcontrast series, namely, $x_i(t)=I_i(t)/I_i(0)$ where $I_i(t)$ is the MR intensity value of voxel i at time t.

The FCM algorithm is then applied to partition the ROI voxels into two categories (c=2): lesion and non-lesion, using the postcontrast enhanced ROI data, i.e., $X=\{x_i, i=1,2,\ldots N | x_i \in \Re^5\}$. The partition matrix U of size 2×N and prototype matrix V of size 2×5 can be obtained by minimizing the objective function defined in Eq. (1). Specifically, matrix V is randomly initialized, then U and V are iteratively updated using Eq. (3) and Eq. (4) until convergence, i.e., until the absolute change of the objective function in consecutive iterations is less than a pre-specified small number $\beta$ ($\beta=10^{-5}$ for example).

Denote the obtained U and V as $U=[U_1 \; U_2]^T$ and $V=[V_1 \; V_2]^T$ where T denotes the matrix transpose, and $U_k$ and $V_k$ (k=1, 2) are row vectors of length N and 5, respectively. The Euclidean norms of $V_k$ (k=1, 2) are used to determine which row represents the lesion. Denote $1=\arg\max_k (\|V_k\|)$, then $V_1$ is the prototype enhancement curve of the lesion class, $U_1$ is the lesion membership map, since the enhancement in lesion area is much more significant than that in surrounding tissues.

Figure 3A:
FIGS. 3A-3D illustrate FCM-based lesion segmentation.
Figure 3B:
Figure 3C:
Figure 3D:

FIG. 3A illustrates the corresponding lesion membership map. FIG. 3B illustrates the lesion membership map binarized with an empirically chosen threshold (T H=0.2). As shown in FIG. 3B, there exist some false positive voxels surrounding the lesion, which either correspond to vessels or background noise. To reduce these spurious structures, a 3-D connected-component labelling operation [32] is performed and the lesion is delineated as illustrated in FIG. 3C. Finally, a hole-filling operation [33] is performed on the 3-D lesion which might comprise some necrotic area in the tumor with very low enhancement that may have been initially partitioned as nonlesion in the FCM procedure. FIG. 3D illustrates the final segmentation result after hole-filling.

Figure 4:
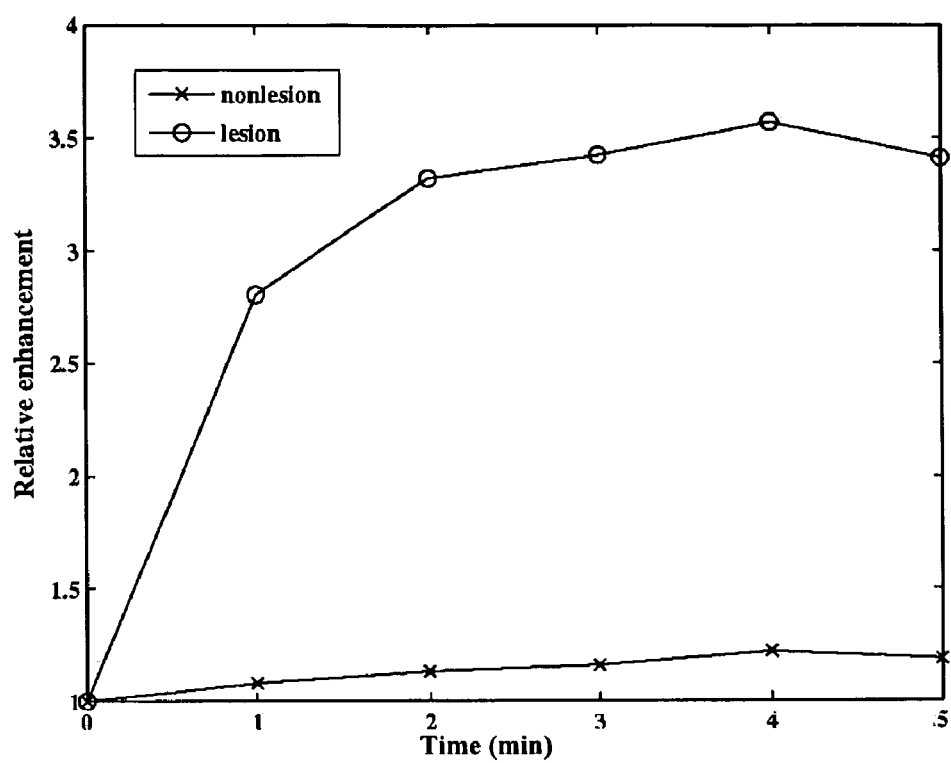
FIG. 4 illustrates FCM-based lesion segmentation illustrates prototype enhancement curves found by FCM for lesion voxels and non-lesion voxels within the ROI.

FIG. 4 illustrates the prototype enhancement curves of lesion and non-lesion for the ROI.

The manual segmentation of the lesion by an expert MR radiologist can serve as reference (i.e., it can be considered the "true outline") in the evaluation of the computerized segmentation method. The manual segmentation was performed slice by slice in the subtracted images (postcontrast image minus precontrast image) and the enhanced tumor area in each slice that intersected the lesion was outlined. All subtraction images were used for this purpose.

The radiologist also used the original (non-subtracted) MR images as additional information. For each delineated lesion, the tumor volume was determined by voxel counting. An overlap measure was also defined as a performance index to quantify the agreement between the computerized segmentation and the radiologist delineation. For a given lesion, denote by C the set of voxels returned from the computerized segmentation and R as the set of voxels in the radiologist's segmentation. The overlap measure, O, is defined as the intersection of C and R over the union of C and R, i.e., $$O = \frac{|C \cap R|}{|C \cup R|} \quad (13)$$

The value of O is bounded between zero (no overlap) and one (exact overlap). Taking the radiologists' delineation as "truth," a lesion is considered to be correctly segmented by the computer when the overlap O between the computerized segmentation and the radiologist's segmentation is larger than a predetermined threshold called overlap threshold.

Figure 5A:
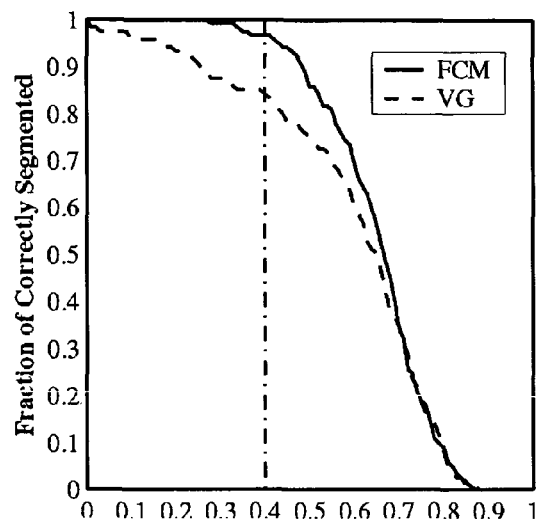
FIGS. 5A and 5B illustrate a comparison of performance between an FCM-based lesion segmentation algorithm and a volume-growing (VG) algorithm.

FIG. 5A illustrates a plot of the fraction of correctly segmented lesions at various overlap threshold levels for both the FCM method and a volume-growing (VG) method [34]. The FCM method outperforms the VG method, i.e., more lesions are correctly segmented by FCM than by VG at various overlap threshold levels. In particular, for an overlap threshold of 0.4, 97% of the lesions are correctly segmented by the proposed FCM based method while 84% of the lesions are correctly segmented by the VG method.

Figure 5B:
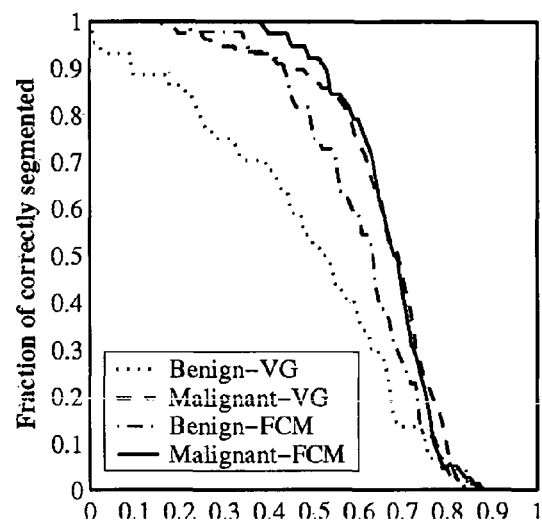

FIG. 5B illustrates a plot of the fraction of correct segmentation versus overlap threshold separately for the benign and malignant lesions. For an overlap threshold of 0.4, 98.7% of the malignant lesions and 93.2% of the benign lesions are correctly segmented by the proposed FCM based method while 93.5% of the malignant lesions and 70.5% of the benign lesions are correctly segmented by the VG method.

Automatic Identification and Classification of Characteristic Curves

In CE-MRI of the breast, signal-intensity time curves have proven useful in differentiating between benign and malignant lesions. Due to uptake heterogeneity in the breast lesion, however, the signal-intensity time curve obtained from a specific region in the lesion may outperform the signal intensity time curve obtained from the entire lesion.

The use of fuzzy c-means (FCM) clustering algorithms revealing different temporal patterns within the breast lesion is now discussed. Different temporal patterns of all the voxels within the lesion can be identified using an FCM algorithm. Specifically, an optimization problem can be formulated for partitioning a lesion of N voxels, each of which is represented by its signal time course, into c classes that correspond to c temporal patterns. The data to be partitioned in Eq. (1) is as follows:

$$X = \{x_i | x_i = (x_{i0}, x_{i1}, \ldots, x_{i(t-1)})\}_{i=1}^{N} \quad (14)$$

where t is the number of time points.

In the implementation, a prototype temporal pattern matrix V is randomly initialized, then membership matrix U and prototype matrix V are obtained through an iterative process using Eq. (2) and (3). The stopping criteria of the iteration is that the Euclidean distance between the current centroids and the centroids in the previous iteration is less than a user specified small number, i.e., $\|v_{new} - v_{old}\| < \epsilon$.

After V is obtained, one selects among c temporal patterns the pattern with maximum initial enhancement as a curve representative of the lesion, $$k = \arg\max_{i=1,2,\ldots,c} \frac{v_{i1} - v_{i0}}{v_{i0}} \quad (15)$$

The corresponding membership map, upon application of a threshold, is the identified region of fast enhancement. According to an embodiment of the present invention, an algorithm can be implemented using the following steps:

1. Obtain enhancement time series data for N voxels within a region of interest and set c=N/100;
2. Initialize V randomly;
3. Update U with Eq. (2);
4. Update V with Eq. (3);
5. If $\|v_{new} - v_{old}\| < \epsilon$ go to 3, otherwise go to 6;
6. Select a curve using Eq. (15).

To classify the lesions into malignant and benign ones, one can extract four features from each curve, which was represented by t time points, i.e., $\{s_0, s_1, \ldots, s_{t-1}\}$, where $s_i (i=0, 1, \ldots, t-1)$ is the signal intensity at time point i. Denoting by s* the maximum of the t signal intensities and p by time point of s*, the four features are defined as:

$$\text{maximum uptake} = (s - s_0)/s_0 \quad (16)$$

$$\text{time to peak} = p \quad (17)$$

$$\text{uptake rate} = (s^* - s_0)/(s_0 \times p) \quad (18)$$

$$\text{washout rate} = \begin{cases} \frac{s^* - s_{t-1}}{s_0 \times (t - p - 1)} & \text{if } p \neq t-1 \\ 0 & \text{if } p = t-1 \end{cases} \quad (19)$$

The four features can be combined using linear discriminant analysis (LD) [35] in the task of distinguishing between malignant and benign lesions. Classification performance of the LDA output in leave-one-out cross validation was assessed using receiver operating characteristic (ROC) analysis [36,37].

FIG. 6 shows a malignant case with a breast lesion displayed across 6 slices. The membership map displayed is based on a 0.4 threshold, i.e., the color-labeled voxels have membership values over 0.4 to the cluster represented by the solid curve in FIG. 6. The signal intensity time curve averaged over the entire lesion (dashed curve) shows a "plateau" pattern. The FCM generated curve, with high initial enhancement, (solid curve) shows a "washout" pattern that is characteristic of malignant lesions.

The four features from signal-intensity time curve obtained from FCM yielded an $A_z$ value of 0.81, whereas the features from the signal-intensity time curve obtained over the entire lesion yielded an $A_z$ value of 0.65 (p-value=0.00001).

Figure 7:
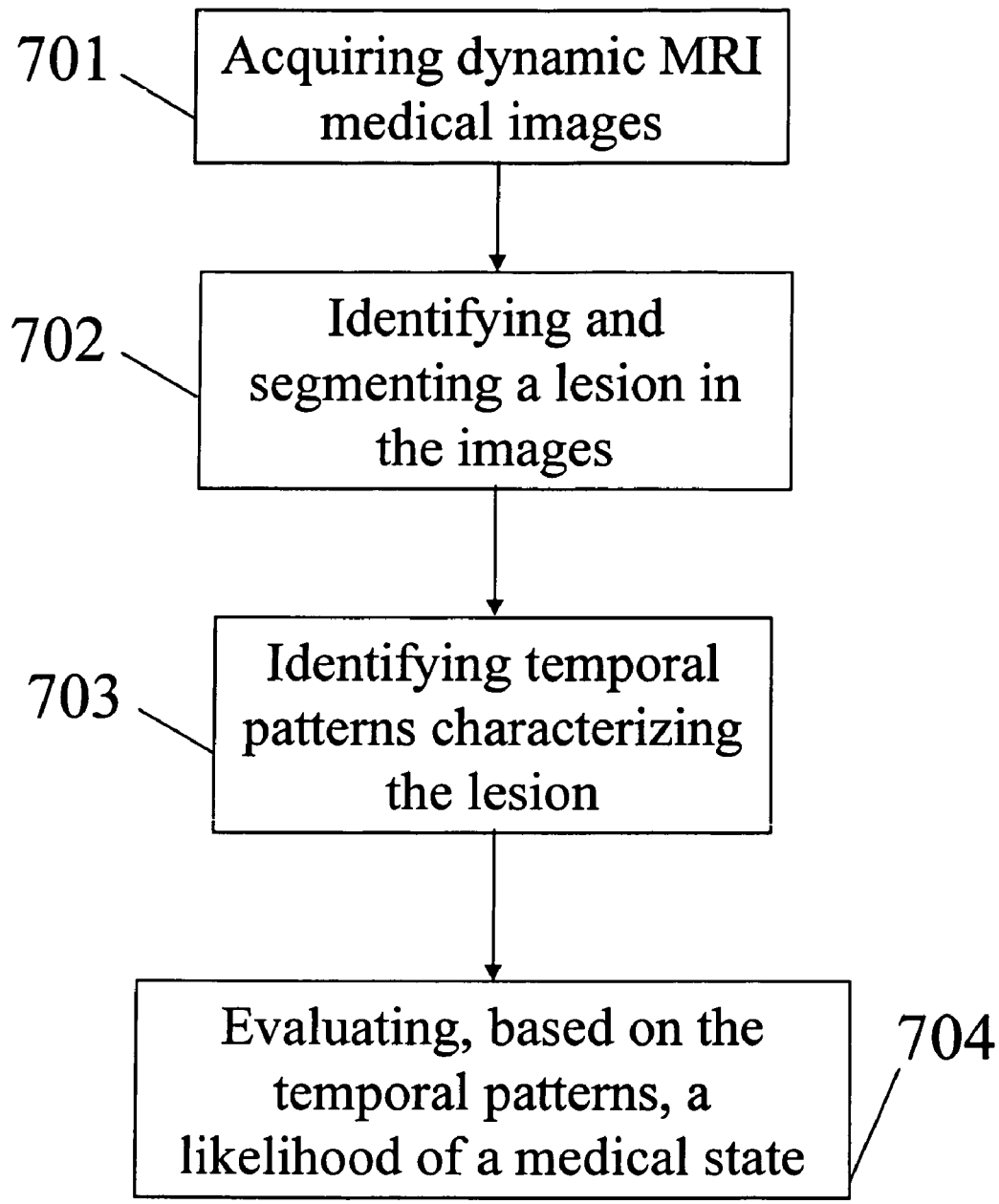
FIG. 7 illustrates an automated analysis and interpretation scheme.

FIG. 7 illustrates a diagram of the proposed computerized analysis and interpretation scheme. In step 701, dynamic MRI images are obtained. In step 702, a lesion is identified and segmented. This can be done automatically with minimal assistance from an operator. In step 703, temporal patterns characterizing the lesion are identified. In step 704, a likelihood of a medical state is evaluated based on the identified temporal patterns.

Automatic Identification of Fatty and Dense Components in Breast Image

Figure 8A:
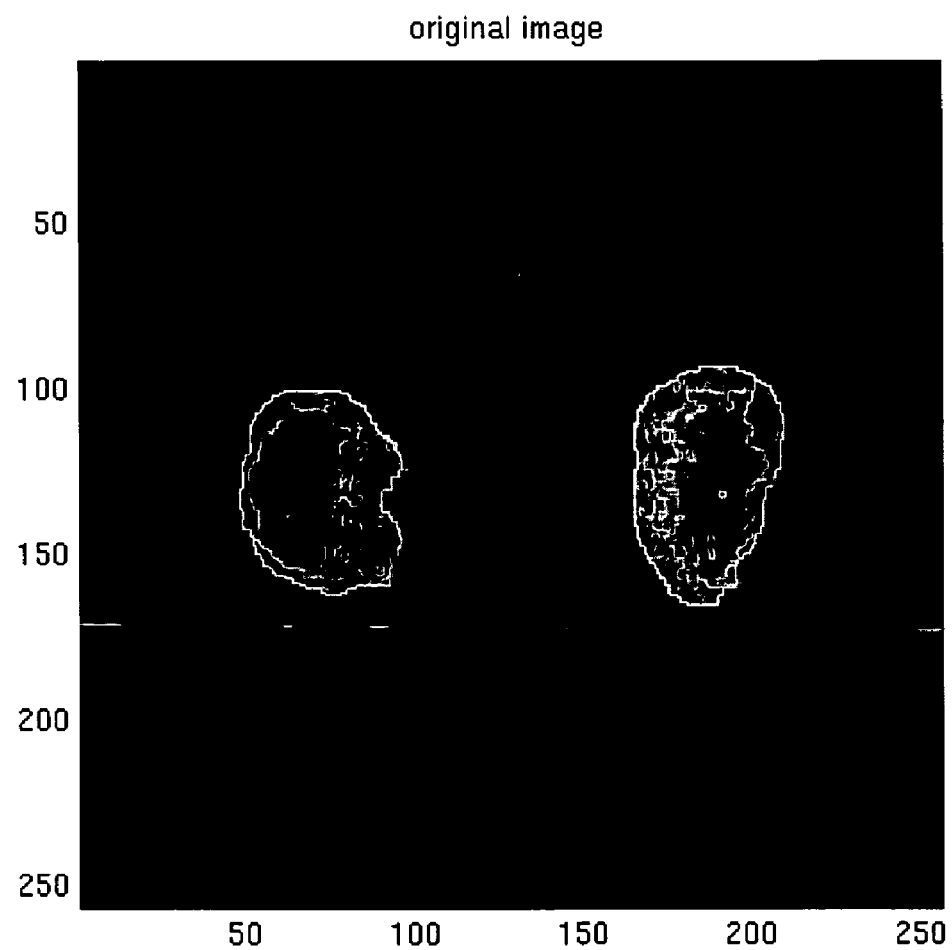
FIGS. 8A-8C illustrate a breast MRI including the original image, the image after a conventional segmentation, and the image after FCM segmentation.
Figure 8B:
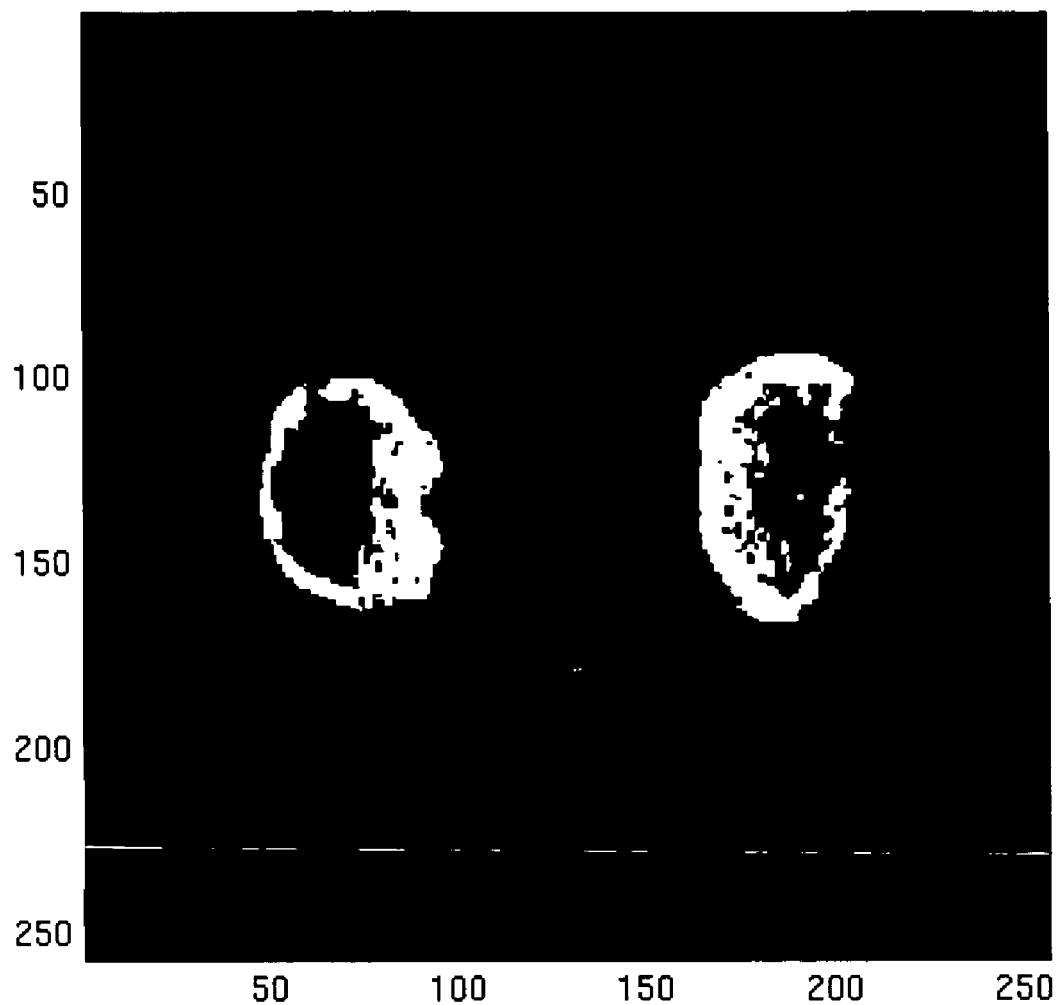
Figure 8C:
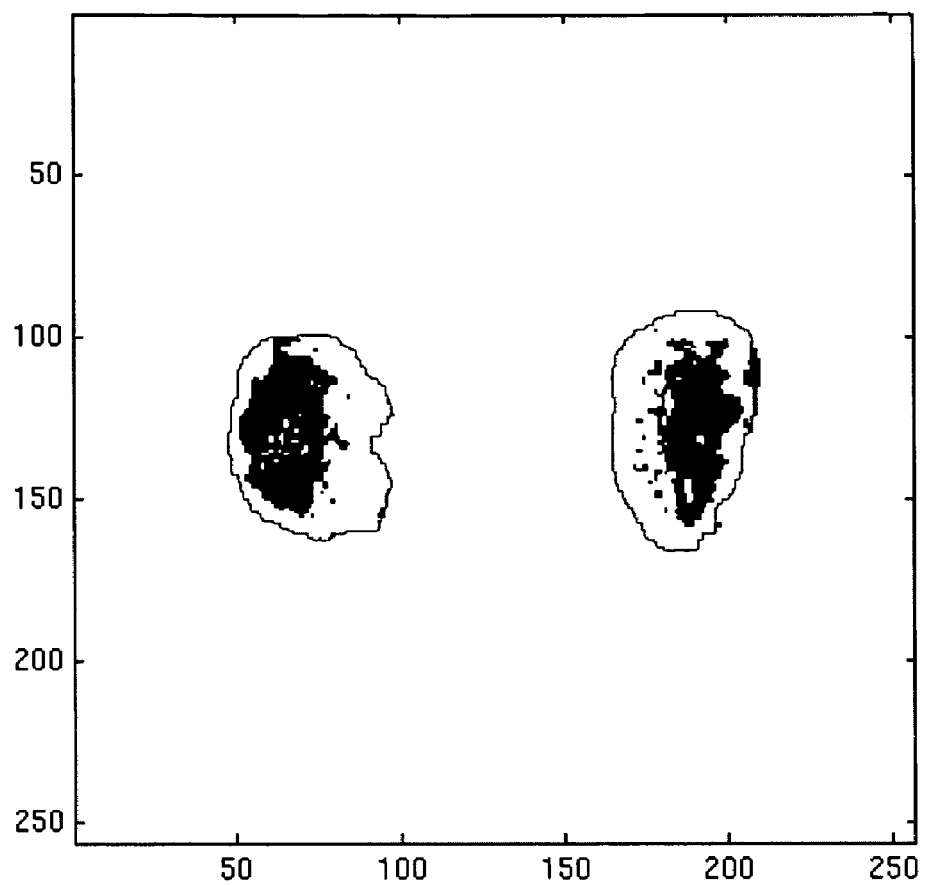

FIGS. 8A-8C illustrate a novel application of the fuzzy c-means method to segment the dense portion of the breast. FIG. 8A illustrates the original image, FIG. 8B illustrates the image after conventional segmentation with histogram thresholding and FIG. 8C illustrates the image after fuzzy c-means segmentation. Such information can be used to assess risk of breast cancer as well as serve as a region of interest for further analysis in the goal of detecting early breast cancer.

Automatic Assessment of Underlying Early Breast Disease

Early breast cancer may be detected by the identification of regions of increased angiogenesis. A c-means clustering technique can be used within the breast or within specified dense or fatty regions to locate such regions automatically. This is similar to the method discussed above for finding the most enhancing voxels within a lesion and paves the way for very early detection of breast cancer prior to the appearance of a lesion.

Figure 9:
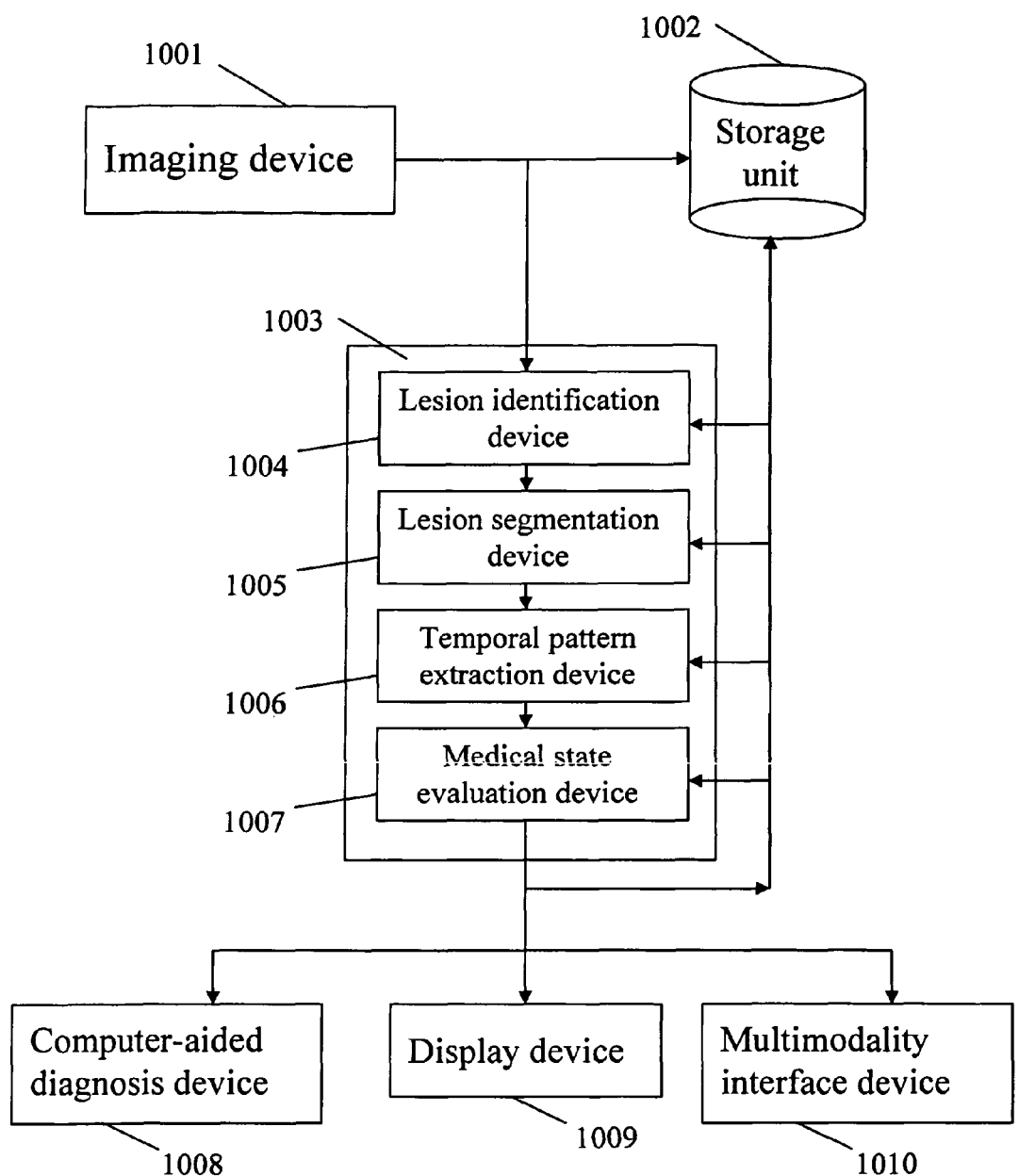
FIG. 9 illustrates a system for analyzing medical images.

FIG. 9 illustrates a system for carrying out embodiments of the present invention. An imaging device 1001 is used to acquire medical images. The images can be stored using a storage unit 1002. The images can be processed by a computing unit 1003 comprising a lesion identification device 1004, which identifies lesions from the background with the assistance of an operator, a lesion segmentation device 1005, which automatically segments the lesion upon being provided by the operator with certain parameters, a temporal pattern extraction device 1006, which determines temporal patterns in the lesion and characterizes the patterns in terms of a type of enhancement, and a medical state evaluation device 1007 which outputs a probability or assessment of a medical condition. The system can also comprise a computer-aided diagnosis device 1008, a display device 1009, and/or a multimodality device 1010, all configured to receive and use the probability or assessment obtained by device 1007.

Alternatively, the image data of interest may be stored in an image archiving system, such as Picture Archiving Communications System (PACS), and retrieved therefrom for processing according to the present invention. Either way, the present invention obtains the image data for subsequent processing as described before.

All embodiments of the present invention conveniently may be implemented using a conventional general purpose computer or micro-processor programmed according to the teachings of the present invention, as will be apparent to those skilled in the computer art. Appropriate software may readily be prepared by programmers of ordinary skill based on the teachings of the present disclosure, as will be apparent to those skilled in the software art. In particular, the computer housing may house a motherboard that contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

Examples of computer readable media associated with the present invention include compact discs, hard disks, floppy disks, tape, magneto-optical disks, PROMs (e.g., EPROM, EEPROM, Flash EPROM), DRAM, SRAM, SDRAM, etc. Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention may be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

For the purposes of this description, an image is defined to be a representation of a physical scene, in which the image has been generated by some imaging technology. Examples of imaging technology include television or CCD cameras, or X-ray, sonar, nuclear, or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitizing a photographic film or digitizing the data from a photostimulable phosphor). The number of dimensions that an image could have could be one (e.g., acoustic signals), two (e.g., X-ray radiological images), or more (e.g., tomosynthesis or nuclear magnetic resonance images).

Numerous modifications and variations of the present invention are possible in light of the above teachings. It is therefore to be understood that within the scope of the appended claims, the invention may be practiced otherwise than as specifically described herein.

The invention claimed is:

1. A method implemented by a computer programmed as a medical state determining apparatus for determining a medical state of an abnormality, comprising:
    obtaining image data including a plurality of three-dimensional medical images of the abnormality, each three-dimensional medical image corresponding to an image of the abnormality acquired at a different time relative to a time of administration of a contrast medium, each three-dimensional medical image having a predetermined number of slices and including a predetermined number of voxels;
    performing automatic segmentation of the abnormality by partitioning, by the medical state determining apparatus, the voxels into at least two groups using a first fuzzy c-means process based on the obtained image data, wherein each group corresponds to a subset of the predetermined number of voxels, and determining which of the at least two groups corresponds to the abnormality;
    partitioning all voxels corresponding to the determined abnormality into a plurality of classes corresponding to a plurality of temporal patterns using a second fuzzy c-means process;
    selecting, from among the plurality of temporal patterns, an enhancement temporal pattern as a temporal pattern representative of the abnormality; and
    determining, based on the selected temporal pattern, a medical state of the abnormality.

2. The method of claim 1, wherein the step of performing automatic segmentation comprises:
    partitioning the voxels into the at least two groups by minimizing a fuzzy generalization of a cost function.

3. The method of claim 1, wherein the obtaining step comprises:
    obtaining magnetic resonance image data of a breast at a plurality of times as the image data representative of the plurality of medical images.

4. The method of claim 1, wherein the selecting step comprises:
    selecting a temporal pattern for which a normalized difference between (1) an image value at a voxel in a first medical image, and (2) an image value at a corresponding voxel in a second medical image is greatest.

5. The method of claim 1, wherein the medical state comprises a probability of a disease state.

6. The method of claim 1, wherein the medical state comprises an assessment of a residual tumor after a treatment.

7. The method of claim 1, wherein the medical state comprises an assessment of the presence of at least one early stage breast disease including ductal carcinoma in situ.

8. The method of claim 1, further comprising:
    applying a bias field correction to the obtained image data to compensate for intensity inhomogeneity artifacts.

9. A non-transitory computer readable medium storing instructions for execution on a computer system, which when executed by the computer system, causes the computer system to determine a medical state of an abnormality by performing the steps of:
    obtaining image data including a plurality of three-dimensional medical images of the abnormality, each three-dimensional medical image corresponding to an image of the abnormality acquired at a different time relative to a time of administration of a contrast medium, each three-dimensional medical image having a predetermined number of slices and including a predetermined number of voxels;
    performing automatic segmentation of the abnormality by partitioning the voxels into at least two groups using a first fuzzy c-means process based on the obtained image data, wherein each group corresponds to a subset of the predetermined number of voxels, and determining which of the at least two groups corresponds to the abnormality;
    partitioning all voxels corresponding to the determined abnormality into a plurality of classes corresponding to a plurality of temporal patterns using a second fuzzy c-means process;
    selecting, from among the plurality of temporal patterns, an enhancement temporal pattern as a temporal pattern representative of the abnormality; and
    determining, based on the selected temporal pattern, a medical state of the abnormality.

10. The computer readable medium of claim 9, wherein the step of performing automatic segmentation comprises:
    partitioning the voxels in into the at least two groups by minimizing a fuzzy generalization of a cost function.

11. The computer readable medium of claim 9, wherein the obtaining step comprises:
    obtaining magnetic resonance image data of a breast at a plurality of times as the image data representative of the plurality of medical images.

12. The computer readable medium of claim 9, wherein the selecting step comprises:
    selecting a temporal pattern for which a normalized difference between (1) an image value at a voxel in a first medical image, and (2) an image value at a corresponding voxel in a second medical image is greatest.

13. The computer readable medium of claim 9, wherein the medical state comprises a probability of a disease state.

14. The computer readable medium of claim 9, wherein the medical state comprises an assessment of a residual tumor after a treatment.

15. The computer readable medium of claim 9, wherein the medical state comprises an assessment of the presence of at least one early stage breast disease including ductal carcinoma in situ.

16. The computer readable medium of claim 9, further comprising:
    applying a bias field correction to the obtained image data to compensate for intensity inhomogeneity artifacts.

17. A system for determining a medical state of an abnormality, comprising:
    a processor configured
        to obtain image data including a plurality of three-dimensional medical images of the abnormality, each three-dimensional medical image corresponding to an image of the abnormality acquired at a different time relative to a time of administration of a contrast medium, each three-dimensional medical image having a predetermined number of slices and including a predetermined number of voxels;
        to perform automatic segmentation of the abnormality by partitioning the voxels into at least two groups using a first fuzzy c-means process based on the obtained image data, wherein each group corresponds to a subset of the predetermined number of voxels, and to determine which of the at least two groups corresponds to the abnormality;

to partition all voxels corresponding to the determined abnormality into a plurality of classes corresponding to a plurality of temporal patterns using a second fuzzy c-means process;

to select, from among the temporal patterns, an enhancement temporal pattern as a temporal pattern representative of the abnormality; and to determine, based on the selected temporal pattern, a medical state of the abnormality.

* * * * *